United States Patent
Sanchez et al.

(10) Patent No.: US 12,450,770 B2
(45) Date of Patent: Oct. 21, 2025

(54) INTELLIGENT ARTICLE ORIENTATION

(71) Applicant: Grupo Bimbo, S.A.B. de CV, Santa Fe (MX)

(72) Inventors: Joel Sanchez, Arlington, TX (US); Florencio Vega Patino, Arlington, TX (US); Jesus Aguirre, Fort Worth, TX (US); Arturo Ignacio Torija, Grand Prairie, TX (US)

(73) Assignee: Grupo Bimbo, S.A.B. de CV, Santa Fe (MX)

( * ) Notice: Subject to any disclaimer, the term of this patent is extended or adjusted under 35 U.S.C. 154(b) by 625 days.

(21) Appl. No.: 17/492,043

(22) Filed: Oct. 1, 2021

(65) Prior Publication Data
US 2023/0105562 A1   Apr. 6, 2023

(51) Int. Cl.
| | | |
|---|---|---|
| G06K 9/00 | (2022.01) | |
| B25J 9/00 | (2006.01) | |
| G06F 18/214 | (2023.01) | |
| G06F 18/28 | (2023.01) | |
| G06N 3/04 | (2023.01) | |
| G06T 7/73 | (2017.01) | |
| G06V 20/68 | (2022.01) | |

(52) U.S. Cl.
CPC ............... *G06T 7/74* (2017.01); *B25J 9/0093* (2013.01); *G06F 18/214* (2023.01); *G06F 18/28* (2023.01); *G06N 3/04* (2013.01); *G06V 20/68* (2022.01)

(58) Field of Classification Search
None
See application file for complete search history.

(56) References Cited

U.S. PATENT DOCUMENTS

| | | |
|---|---|---|
| 4,147,930 A | 4/1979 | Browne et al. |
| 4,493,420 A | 1/1985 | Dennis |
| 5,630,496 A | 5/1997 | Mims |
| 5,659,624 A | 8/1997 | Fazzari et al. |
| 6,508,351 B1 | 1/2003 | Christoffersen et al. |
| 8,733,240 B2 | 5/2014 | Randazzo |
| 8,827,082 B2 | 9/2014 | Radema et al. |
| 9,789,518 B2 | 10/2017 | Iino |
| 10,074,191 B1 * | 9/2018 | Reome ................... G01S 17/87 |
| 10,268,927 B2 | 4/2019 | Everett et al. |
| 10,368,571 B2 | 8/2019 | Crescenzo et al. |
| 10,512,942 B2 | 12/2019 | Tandon |
| 10,596,601 B2 | 3/2020 | Yoon et al. |
| 2005/0099620 A1 | 5/2005 | De La Ballina et al. |
| 2017/0290345 A1 * | 10/2017 | Garden .................... A21C 9/08 |
| 2021/0133670 A1 * | 5/2021 | Cella ...................... G06N 3/044 |
| 2022/0161427 A1 * | 5/2022 | Yerazunis ............. B25J 9/1674 |

FOREIGN PATENT DOCUMENTS

JP    H10-231018 A    9/1998

* cited by examiner

*Primary Examiner* — Wei Wen Yang
(74) *Attorney, Agent, or Firm* — Crowell & Moring LLP; John C. Freeman

(57) ABSTRACT

A system may include an article stream. Variable-appearance articles within the stream may have various orientation states. In some cases, to support later processing, articles may be transitioned from anomalous orientations into one or more nominal orientations which are later processing ready. In some cases, determining the current orientation of the variable-appearance articles may be performed using an adaptive classification routine.

26 Claims, 4 Drawing Sheets

INTELLIGENT ARTICLE ORIENTATION

TECHNICAL FIELD

This disclosure relates to reaction condition determination.

BACKGROUND

Automation in article production flows has led to reduced costs through increases in speed, scale and fewer human touches per article. For example, production lines with automation produce tens of trillions of dollars' worth of goods every year. Improvements in the flexibility, speed, and/or performance of automated production flows will continue to drive demand.

DETAILED DESCRIPTION

Figure 1:
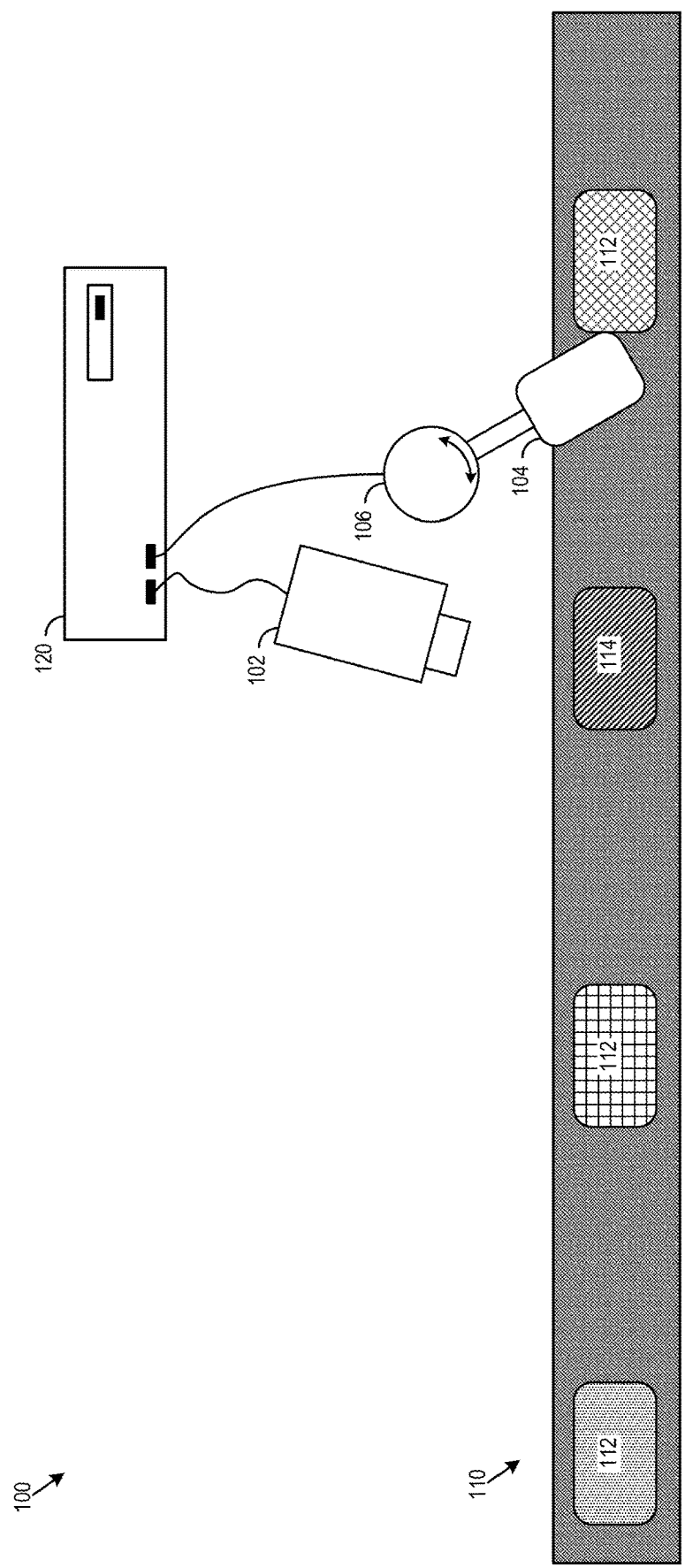
FIG. 1 shows an example article orientation system.

In various contexts, articles may be transported on an article stream such as a production line, manufacturing flow, conveyer system or other article stream. The articles may be later processed. For example, the articles may be packed, have additional productions steps applied (rolls may be frosted, wooden objects may be milled, articles may be painted, and/or exposed other production steps), and/or otherwise processed. In some cases, the later processing may be orientation dependent. For example, in a scenario where the articles are later packed, a system may orient the articles uniformly/deterministically for packing: to protect the articles, to increase visual aesthetics, or other orientation-dependent packing priorities.

In some cases, articles may be variable-appearance articles. Variable-appearance have non-uniform characteristics and/or low-contrast characteristics that indicate orientation, or other characteristics that may frustrate direct image correlations with images that model proper or improper orientations. For example, for a baked good, a top of the baked good may have characteristics that distinguish the baked good from the bottom of the baked good. In some cases, the distinguishing characteristics may exhibit less contrast than edges, object shape, and/or characteristics common to multiple orientations. For example, in the context of baked goods, articles (such as a bagels, cookies, English muffins, and/or other baked goods) may have increased browning on the top and bottom relative to the sides of the baked good. Further, the size and distribution of the browning may (in some cases) vary from baked-good to baked-good more than between the top and bottom of a single good. Accordingly, a top of particular good may have a sufficiently strong correlation to an underside in a model image to register as a bottom. In the context of clothing articles, a particular piece of clothing may be a uniform color and may shift in shape due to folding. Accordingly, the appearance of clothing (even when in a constant orientation) may change from article to article.

Accordingly, the conventional wisdom teaches that manual identification of anomalous orientation (e.g., orientations that differ from a nominal orientation used in variable-appearance article processing) where correlation to a static set of images may not necessarily (and/or reliably) allow for identification of orientation states.

The architectures and techniques discussed apply adaptive classification routines to determine article orientation based on captured images (in some cases, including real-time captured images) of the articles while in-stream (e.g., within article production streams, article packing streams, article inspection streams, and/or other article streams). Adaptive classification routines may include machine-learning models may be developed trained to classify orientation states for articles. As an illustrative example, a bagel (as the article) may have a nominal orientation state (e.g., such as upright (or up-side down) on a conveyer in which the bagel is ready for later stage processing, such as packaging—the nominal orientation then being "packing-ready". Orientation states other than the nominal orientation state would be anomalous orientations states in which the bagel is not ready for later state processing. For a bagel, in many cases, rotational symmetries and/or stable resting orientations for the bagel may preclude orientation states other than upright and upside down. However, in some cases, bagels may rest against one another and/or sides of the article stream allowing other orientation states. In various implementations, nominal orientations and anomalous orientations may be defined for the articles being processed.

The adaptive classification routines may include image classification and/or image transformation routines. For example, artificial neural networks (ANNs) may be used. In some cases, specific ANNs may be used such a multiple-layer and/or deep neural networks, convolutional neural networks, Unet neural networks, EfficientNet neural networks, neural networks employing transfer learning (e.g., where one or more neural network layer are copied (at least in part) from another existing neural network). For example, include image classification and/or image transformation routines, may include k-nearest neighbor classification, support vector machines, random forest classification, supervised machine learning, unsupervised machine learning, or other adaptive classification routine. In various implementations, an adaptive classification routines may include a routine in which repeated operation and/or training inputs may change determinations. In other words, rather than depend on a set operation to determine a particular orientation (such as executing a correlation), adaptive classification routines may 'adapt' through input/output analysis and/or feedback.

FIG. 1 shows an example article orientation system (AOS) 100. The AOS 100 may include an article stream 110. In the example AOS, the article stream is shown as a conveyer for the purposes of illustration. However, virtually any article flow system (e.g., system of moving articles) may be used. The AOS 100 may further include an image capture device 102 (e.g., charge-coupled-device (CCD), CMOS sensors, and/or other camera). The image capture device 102 may capture images of the articles 112 on the article stream 110. The image capture device 102 may be placed at a known relative position with respect to the article stream. For example, the image capture device 102 may be placed above or below the stream. Where multiple image capture devices are used, the image capture devices may capture images from multiple relative positions (e.g., above and below). Based on the relative position, it can be known what portion of the article is being imaged. For example, the image capture device 102 may have a view of the top and left side of the article stream. In an example, the image capture device 102 may have a view of the bottom and side of the article stream. Accordingly, based on the appearance of the articles from the known relative position, the orientation of the article can be determined. Note that the examples of identification/categorization of the relative position of the image capture device 102 with respect to the article stream 110 or conveyor, wherein the image capture device 102 is 1) above the article stream 110 or the conveyor or 2) below the article stream 110 or the conveyor are each defined as a prepositional characterization of the relative position. It is well known that a "preposition" shows the relationship between a noun or pronoun to another word.

The AOS 100 may further include control circuitry 120. The control circuitry may execute the adaptive classification routine to classify the appearance of articles within the article stream. Then, based on the classified appearance and the known relative position, the control circuitry may determine the orientation of the article. For example, adaptive classification routine may indicate that a top of the article is visible. When it is determined that the prepositional characterization of the position of the image capture device 102 relative to the article stream 110 is above the article stream 110, a determination that the top of the article is visible may indicate that the article is upright. Conversely, when it is determined that the prepositional characterization of the position of the image capture device 102 relative to the article stream 110 is below the article stream 110, a determination that the top of the article is visible may indicate that the article is upside-down.

The AOS 100 may include a reorientation guide 104, such as a guide rail, flipper, turntable, or other mechanical device for altering orientation of an article. The reorientation guide 104 may be positioned using a reorientation actuator 106. The reorientation actuator 106 may include an actuator (such as a servo motor, a linear actuator, a hydraulic actuator, a pneumatic actuator, or other actuator). The reorientation actuator 106 may transition (e.g., move) the reorientation guide between a disengaged state (e.g., where the reorientation guide does not intervene in orientation and/or intervenes to maintain a nominal orientation) and one or more engaged states (e.g., where the reorientation guide intervenes to alter orientation of an article and/or is positioned not to intervene resulting in a failure to preserve an anomalous orientation).

Figure 2:
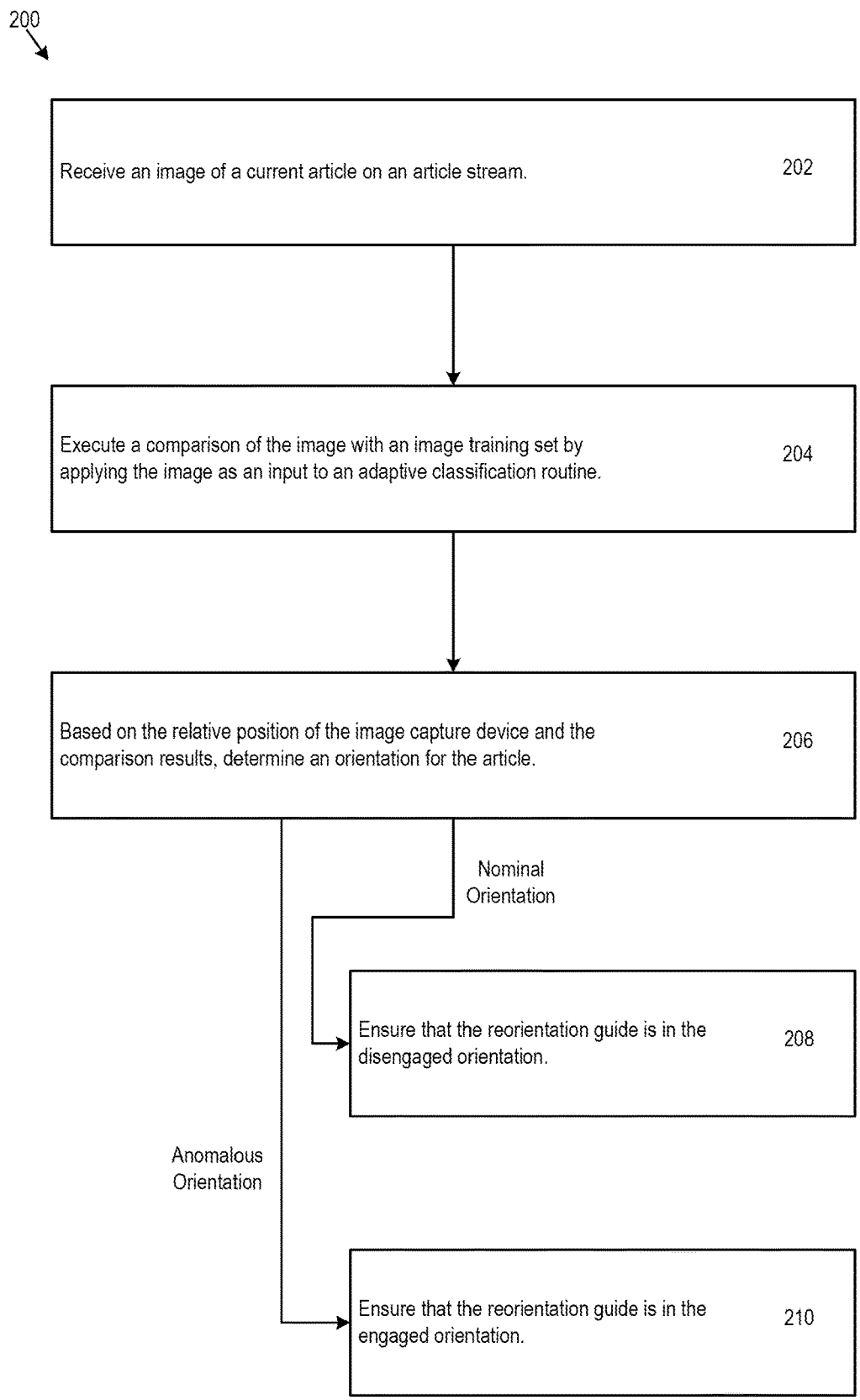
FIG. 2 shows example orientation logic.

Reference is now made to FIG. 2 while continuing to refer to FIG. 1. FIG. 2 shows example orientation logic (OL) 200, e.g., which may be executed on control circuitry 120 to govern the operation of the control circuitry.

The OL 200 may cause the receive an image of a current article 114 transported on the article stream 110 (202). The image may be captured as a result of periodic image capture, triggered image capture (e.g., via article position), video capture, and/or other image capture scheme.

At the control circuitry, the OL 200 may preprocess the image. For example, portions of the image may be cropped, recolored, and/or otherwise preprocessed. For example, an image may be cropped to focus on a single article and/or to cut articles other than one or more being analyzed from the image.

In some cases, the image may include articles from multiple parallel article streams. Preprocessing may include assignment of particular in-image pixel positions to particular article streams. In some cases, separate cameras may be used for individual streams which may be controlled by separate logic (e.g., each with their own OL) or central logic (multiple cameras controlled by the same OL). In some cases, images from multiple cameras may be concatenated by the OL 200 during preprocessing to facilitate central orientation analysis.

In various implementations, the OL 200 may execute a comparison of the image with an image training set by applying the image as an input to an adaptive classification routine (204). For example, the OL 200 may apply the image (e.g., and/or bit representing the image) to an input layer of an ANN. In another example, the image may be classified using hyperplane-division in a support vector machine classification routine (e.g., where hyperplanes a determined to divide groups into subsets based on datasets (e.g., a collection of pixel data) for each member of the group. Other adaptive classification routines may used.

After classifying the image, the OL 200 may use the relative position of the image capture device and the comparison results of the adaptive classification to determine an orientation for the article (206). For example, the OL 200 may determine a top of an article is visible in the image. Based on the identification of the top of the image and a relative image capture device 102 position (such as the prepositional characterization that the image capture device is above the article stream 110), the OL 200 may then determine that the top of the article is pointing up. As discussed above, a nominal orientation may include an orientation in which the article is ready for later processing. An anomalous orientation may include orientations other than the nominal orientation. In the example, if the nominal orientation were upright (e.g., top upward), the OL 200 would determine that example article is in the nominal orientation. Conversely, if the nominal orientation were upside-down, the OL 200 would determine that example article is in an anomalous orientation.

When the current article is in the nominal orientation, the OL 200 may ensure that the reorientation guide 104 is in the disengaged position (208). In some cases, ensuring that the reorientation guide 104 is in the disengaged position may include signaling the reorientation actuator 106 to move the reorientation guide to the disengaged position. In some cases, ensuring that the reorientation guide 104 is in the disengaged position may include taking no action based on previous signaling moving the reorientation guide to the disengaged position. In some cases, the OL 200 may use two-way communication with the reorientation guide 104 and/or reorientation actuator 106 to determine the current position of the reorientation guide 104. Then based on the current position, the OL 200 may determine whether moving the reorientation guide is appropriate.

Similarly, when the current article is an anomalous orientation the OL 200 may ensure that the reorientation guide 104 is in the engaged position (210). Ensuring that the reorientation guide is in the engaged position may use express signaling (e.g., to affirmatively send controls to place the reorientation guide in the engaged position); implicit determination that the reorientation guide is in the engaged position; and/or polling to determine position followed by signalling for movement if the reorientation guide is in the disengaged position.

In various implementations, the OL 200 may affirmatively send signaling to the reorientation actuator/reorientation guide for individual articles. In some implementations, the OL 200 may send signaling in situations where there is an orientation change relative to a previous article. In an illustrative scenario, a flipper may be moved (by the OL 200) to invert an upside-down English muffin that is followed by several muffins determine to also be upside-down. The OL 200 may forgo signaling until an upright muffin captured by the camera. Then, the OL 200 may then signal to move the flipper to a disengaged position. In some cases, signaling reorientation adjustments in response to relative orientation changes (e.g., instead of per article) may allow for increased system throughput.

Figure 3:
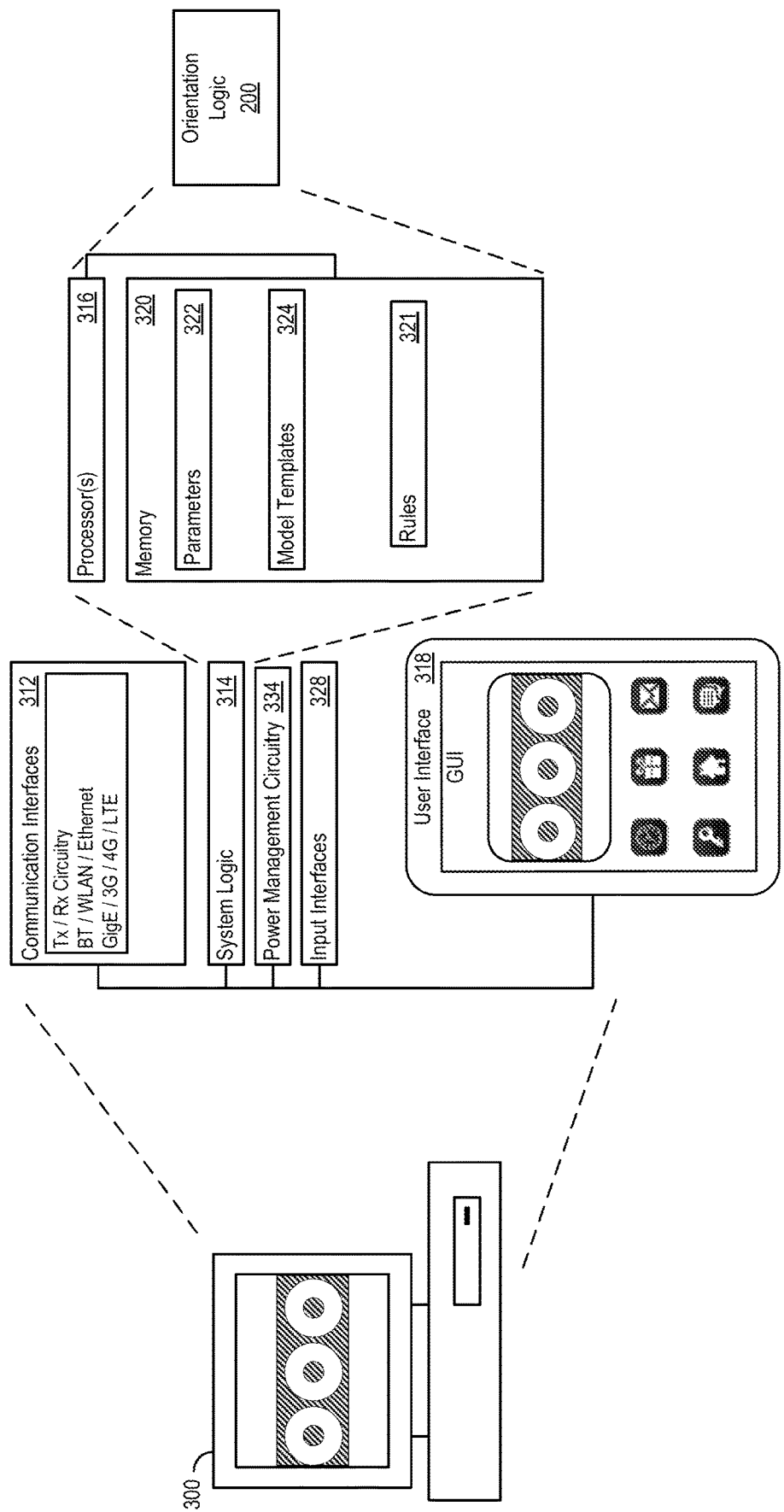
FIG. 3 shows an example execution environment.

FIG. 3 shows an example execution environment (EE) 300 for implementing the OL 200. In various implementations, implementing the OL 200 on the EE 300 may transform the EE 300 into specifically-configured circuitry. Accordingly, when the OL 200 is implemented on the EE 300, the EE 300 may become specifically-configured control circuitry 120. The EE 300 may include system logic 314 to support tasks such as image comparisons, adaptive classification, image pre-processing, image capture, and/or other tasks. The system logic 314 may include processors 316, memory 320, and/or other circuitry, which may be used to implement OL 200, which may provide software support to support tasks such as image comparisons, adaptive classification, image pre-processing, image capture, and/or other tasks.

The memory 320 may be used to store parameters 322 and/or model templates 324 used in the adaptive classification routines. The memory 320 may further store rules 321, that may facilitate image capture timing, actuator signaling responses, classification training protocols, and/or other operation.

The memory 320 may further include applications and structures, for example, coded objects, templates, or one or more other data structures relevant to operation of the AOS 100. The EE 300 may also include one or more communication interfaces 312, which may support wireless, e.g. Bluetooth, Wi-Fi, WLAN, cellular (3G, 4G, 5G, LTE/A), and/or wired, ethernet, Gigabit ethernet, optical networking protocols. The communication interface 312 may support communication, e.g., through the communication layer as network interface circuitry, with data sources or resources used to invoke classification routines, perform device maintenance and/or updates, coordinate with a central control hub, and/or perform other communication tasks. Additionally or alternatively, the communication interface 312 may support secure information exchanges, such as secure socket layer (SSL) or public-key encryption-based protocols for sending and receiving proprietary data. The EE 300 may include power management circuitry 334 and one or more input interfaces 328.

The EE 300 may also include a user interface 318 that may include man-machine interfaces and/or graphical user interfaces (GUI). The GUI may be used to present interfaces and/or options to operators involved in control of system operation, timing parameters, and/or other operator controls.

Example Implementations

The example implementations below are included to illustrate the architectures and techniques described above. The example implementations are not included to limit the architectures and techniques. The features described in the example implementations below and in the architectures and techniques describe above may be implemented in any combination and/or individually.

Figure 4:
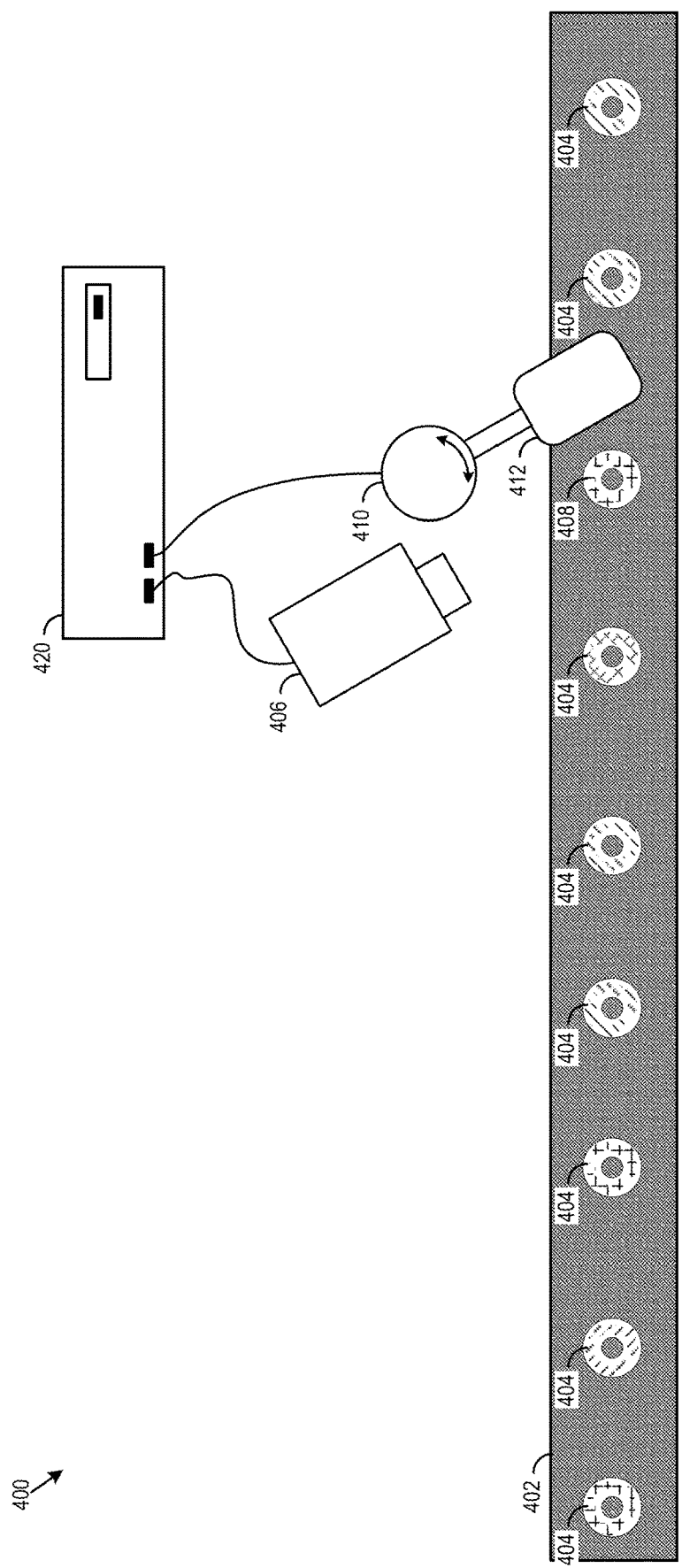
FIG. 4 shows an example bagel production stream.

For an illustrative example implementation, FIG. 4 shows an example bagel production stream 400. The example bagel production stream 400 may include a conveyer 402 on which bagels 404 are transported. A camera 406 may capture images of the bagels. The camera 406 may pass the images to control circuitry 420 that may compare the images to a training image set using an adaptive classification routine.

Based on the relative position of the camera 406 to the conveyer and the comparison, the control circuitry 420 may determine whether a current bagel 408 is upside-down or upright. When the current bagel 408 is upside-down (and therefore unready for packing), the control circuitry may send a signal to a reorientation actuator 410 to move a bagel flipper 412 into an engaged position to invert the current bagel 408.

After passing the bagel flipper 412, the bagels may be packed in a uniform packing-ready orientation.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Table 1 includes various examples.

TABLE 1

Examples

1. A system including:
a conveyer;
a camera to capture an image of a current bagel transported by the conveyer, the camera positioned at a predetermined relative location;
a bagel flipper;
a reorientation actuator operative to move the bagel flipper between an engaged state and a disengaged state;
control circuitry in operative communication with the camera and the reorientation actuator, the control circuitry configured to:
receive the image;
execute a comparison of the image with a training image set by applying the image as an input to an adaptive classification routine executing on the control circuitry, the adaptive classification routine trained using at least the training image set, the training image set including upright training images of baked bagels in an upright orientation on the bagel production stream and upside-down training images of baked bagels in an upside-down orientation on the bagel production stream;
based on the predetermined relative location and the comparison, determine whether the current bagel is characterized by an upright orientation or an upside-down orientation;
at a time when the current bagel is determined to be characterized by an upside-down orientation, cause the reorientation actuator to move the bagel flipper from the disengaged state to the engaged state to ready the bagel flipper to invert the current bagel.
2. A system including:
an article stream;
a camera to capture an image of a current variable-appearance article transported by the article stream, the camera positioned at a predetermined relative location in relation to the article stream;
a reorientation guide;
a reorientation actuator operative to move the reorientation guide between an engaged state and a disengaged state;
control circuitry in operative communication with the camera and the reorientation actuator, the control circuitry configured to:
receive the image;
execute a comparison of the image with a training image set by applying the image as an input to an adaptive classification routine executing on the control circuitry, the adaptive classification routine trained using at least the training image set;
based on the predetermined relative location and the comparison, determine whether the current variable-appearance article is characterized by a nominal orientation or an anomalous orientation;
at a time when the current variable-appearance article is determined to be characterized by an anomalous orientation, cause the reorientation actuator to move the reorientation guide from the disengaged state to the engaged state.
3. The system of example 2 or any other example in this table, where:
the article stream includes a production flow of baked goods;
the training image set includes multiple images of baked goods after baking.
4. The system of example 2 or any other example in this table, where the reorientation guide includes a flipper to invert the current variable-appearance article when in the engaged state.
5. The system of example 2 or any other example in this table, where:
the nominal orientation includes a packing-ready orientation; and
the anomalous orientation includes an orientation other than the packing-ready orientation.
6. The system of example 2 or any other example in this table, where:
the nominal orientation includes an upright orientation; and
the anomalous orientation includes an upside-down orientation.
7. The system of example 2 or any other example in this table, where the control circuitry is configured to:
cause the reorientation actuator to move the reorientation guide from the disengaged state to the engaged state at a time when the article is determined to be characterized by an anomalous orientation by causing the reorientation guide from the disengaged state to the engaged state when the current variable-appearance article is determined to be characterized by a different orientation than a previous article;
cause the reorientation actuator to leave the reorientation guide in the engaged state until a time when a future article is determined to be characterized by the nominal orientation.

TABLE 1-continued

Examples

8. The system of example 2 or any other example in this table, where the adaptive classification routine includes:
a k-nearest neighbor classification;
a support vector machine;
an artificial neural network;
a convolutional neural network;
an EfficientNet neural network;
a deep neural network;
a random forest classification;
supervised machine learning;
unsupervised machine learning; or
any grouping of the forgoing.
9. The system of example 2 or any other example in this table, where:
the adaptive classification routine includes a deep neural network; and
the deep neural network includes a transferred layer generated at least in part via a transfer learning process, the transfer learning processing include copying a least a portion of the transferred layer from another neural network.
10. The system of example 2 or any other example in this table, where the camera is positioned to image a single article at a time.
11. The system of example 2 or any other example in this table, where the camera is positioned to image multiple articles at a time.
12. The system of example 11 or any other example in this table, where the system includes:
multiple reorientation guides including the reorientation guide;
multiple reorientation actuators including the reorientation actuator; and
the control circuitry is configured to control multiple ones of the reorientation actuators based on a single image from the camera.
13. A method including:
receiving, from a camera at a predetermined relative location in reference to an article stream, an image of a current variable-appearance article transported by the article stream;
executing a comparison of the image with a training image set by applying the image as an input to an adaptive classification routine executing on control circuitry, the adaptive classification routine trained using at least the training image set;
based on the predetermined relative location and the comparison, determining whether the current variable-appearance article is characterized by a nominal orientation or an anomalous orientation;
at a time when the current variable-appearance article is determined to be characterized by an anomalous orientation, causing a reorientation actuator to move a reorientation guide from a disengaged state to an engaged state.
14. The method of example 13 or any other example in this table, where:
the article stream includes a production flow of baked goods;
the training image set includes multiple images of baked goods after baking.
15. The method of example 13 or any other example in this table, where:
the reorientation guide includes a flipper to invert the current variable-appearance article when in the engaged state; and
the method further includes inverting the current variable-appearance article to shift the current variable-appearance article to the nominal orientation.
16. The method of example 13 or any other example in this table, where:
the nominal orientation includes a packing-ready orientation; and
the anomalous orientation includes an orientation other than the packing-ready orientation.
17. The method of example 13 or any other example in this table, where:
the nominal orientation includes an upright orientation;
the anomalous orientation includes an upside-down orientation; and
the method further includes inverting the current variable-appearance article to shift the current variable-appearance article to the upright orientation.
18. The method of example 13 or any other example in this table, where the adaptive classification routine includes:
a k-nearest neighbor classification;
a support vector machine;
an artificial neural network;
a convolutional neural network;
an EfficientNet neural network;
a deep neural network;
a random forest classification;
supervised machine learning;
unsupervised machine learning; or
any grouping of the forgoing.
19. The method of example 13 or any other example in this table, where:
the adaptive classification routine includes a deep neural network; and
the deep neural network includes a transferred layer generated at least in part via a transfer learning process, the transfer learning processing include copying a least a portion of the transferred layer from another neural network.
20. The method of example 13 or any other example in this table, where the camera is positioned to image a single article at a time.
21. A method performed by implementing the system of any of the other examples in this table.

TABLE 1-continued

Examples

22. Machine-readable media; and
instructions stored on the machine-readable media, the instructions configured to
cause a machine to perform the method of example 21 or any other example in this
table, where:
optionally, the machine-readable media is non-transitory;
optionally, the machine-readable media is other than a transitory signal; and
optionally, the instructions include executable instructions.
23. A system including circuitry configured to implement any feature or any
combination of features described in the disclosure.
24. A method including implementing any feature or any combination of features
described in the disclosure.
25. Machine-readable media; and
instructions stored on the machine-readable media, the instructions configured to
cause a machine to implement any feature or any combination of features described
in the disclosure, where:
optionally, the machine-readable media is non-transitory;
optionally, the machine-readable media is other than a transitory signal; and
optionally, the instructions include executable instructions.

Various implementations have been specifically described. However, many other implementations are also possible.

Headings and/or subheadings used herein are intended only to aid the reader with understanding described implementations.

What is claimed is:

1. A system comprising:
a conveyer;
a camera to capture an image of a current bagel transported by the conveyer, the camera positioned at a predetermined relative location in relation to the conveyer;
a bagel flipper;
a reorientation actuator operative to move the bagel flipper between an engaged state and a disengaged state;
control circuitry in operative communication with the camera and the reorientation actuator, the control circuitry configured to:
receive the image;
execute a comparison of the image with a training image set by applying the image as an input to an adaptive classification routine executing on the control circuitry, the adaptive classification routine trained using at least the training image set, the training image set including upright training images of baked bagels in an upright orientation on the bagel production stream and upside-down training images of baked bagels in an upside-down orientation on the bagel production stream;
based on a prepositional categorization of the predetermined relative location in relation to the conveyor and the executed comparison of the image, determine whether the current bagel is characterized by an upright orientation or an upside-down orientation, wherein the prepositional categorization is either the camera is above the conveyor or the camera is below the conveyor;
at a time when the current bagel is determined to be characterized by an upside-down orientation, cause the reorientation actuator to move the bagel flipper from the disengaged state to the engaged state to ready the bagel flipper to invert the current bagel.

2. A system comprising:
an article stream;
a camera to capture an image of a current variable-appearance article transported by the article stream, the camera positioned at a predetermined relative location in relation to the article stream;
a reorientation guide;
a reorientation actuator operative to move the reorientation guide between an engaged state and a disengaged state;
control circuitry in operative communication with the camera and the reorientation actuator, the control circuitry configured to:
receive the image;
execute a comparison of the image with a training image set by applying the image as an input to an adaptive classification routine executing on the control circuitry, the adaptive classification routine trained using at least the training image set;
based on a prepositional categorization of the predetermined relative location in relation to the article stream and the executed comparison of the image, determine whether the current variable-appearance article is characterized by a nominal orientation or an anomalous orientation, wherein the prepositional categorization is either the camera is above the article stream or the camera is below the article stream;
at a time when the current variable-appearance article is determined to be characterized by an anomalous orientation, cause the reorientation actuator to move the reorientation guide from the disengaged state to the engaged state.

3. The system of claim 2, wherein:
the article stream comprises a production flow of baked goods;
the training image set comprises multiple images of baked goods after baking.

4. The system of claim 2, wherein the reorientation guide comprises a flipper to invert the current variable-appearance article when in the engaged state.

5. The system of claim 2, wherein:
the nominal orientation comprises a packing-ready orientation; and
the anomalous orientation comprises an orientation other than the packing-ready orientation.

6. The system of claim 2, wherein:
the nominal orientation comprises an upright orientation; and
the anomalous orientation comprises an upside-down orientation.

7. The system of claim 2, wherein the control circuitry is configured to:
cause the reorientation actuator to move the reorientation guide from the disengaged state to the engaged state at a time when the current variable-appearance article is determined to be characterized by an anomalous orientation by causing the reorientation guide to move from the disengaged state to the engaged state when the current variable-appearance article is determined to be characterized by a different orientation than a previous article;
cause the reorientation actuator to leave the reorientation guide in the engaged state until a time when a future article is determined to be characterized by the nominal orientation.

8. The system of claim 2, wherein the adaptive classification routine comprises:
a k-nearest neighbor classification;
a support vector machine;
an artificial neural network;
a convolutional neural network;
an EfficientNet neural network;
a deep neural network;
a random forest classification;
supervised machine learning;
unsupervised machine learning; or
any grouping of the forgoing.

9. The system of claim 2, wherein:
the adaptive classification routine comprises a deep neural network; and
the deep neural network comprises a transferred layer generated at least in part via a transfer learning process, the transfer learning process comprising copying at least a portion of the transferred layer from another deep neural network.

10. The system of claim 2, where the camera is positioned to image a single current variable-appearance article at a time.

11. The system of claim 2, where the camera is positioned to simultaneously image the current variable-appearance article and a second current variable-appearance article.

12. The system of claim 11, wherein the system comprises:
a second reorientation guide;
a second reorientation actuator; and
the control circuitry is configured to control the reorientation actuator and the second reorientation actuator based on a single image from the camera.

13. A method comprising:
receiving, from a camera at a predetermined relative location in reference to an article stream, an image of a current variable-appearance article transported by the article stream;
executing a comparison of the image with a training image set by applying the image as an input to an adaptive classification routine executing on control circuitry, the adaptive classification routine trained using at least the training image set;
based on a prepositional categorization of the predetermined relative location in reference to the article stream and the executed comparison of the image, determining whether the current variable-appearance article is characterized by a nominal orientation or an anomalous orientation, wherein the prepositional categorization is either the camera is above the article stream or the camera is below the article stream;
at a time when the current variable-appearance article is determined to be characterized by an anomalous orientation, causing a reorientation actuator to move a reorientation guide from a disengaged state to an engaged state.

14. The method of claim 13, wherein:
the article stream comprises a production flow of baked goods;
the training image set comprises multiple images of baked goods after baking.

15. The method of claim 13, wherein:
the reorientation guide comprises a flipper to invert the current variable-appearance article when in the engaged state; and
the method further comprises inverting the current variable-appearance article to shift the current variable-appearance article to the nominal orientation.

16. The method of claim 13, wherein:
the nominal orientation comprises a packing-ready orientation; and
the anomalous orientation comprises an orientation other than the packing-ready orientation.

17. The method of claim 13, wherein:
the nominal orientation comprises an upright orientation;
the anomalous orientation comprises an upside-down orientation; and
the method further comprises inverting the current variable-appearance article to shift the current variable-appearance article to the upright orientation.

18. The method of claim 13, wherein the adaptive classification routine comprises:
a k-nearest neighbor classification;
a support vector machine;
an artificial neural network;
a convolutional neural network;
an EfficientNet neural network;
a deep neural network;
a random forest classification;
supervised machine learning;
unsupervised machine learning; or
any grouping of the forgoing.

19. The method of claim 13, wherein:
the adaptive classification routine comprises a deep neural network; and
the deep neural network comprises a transferred layer generated at least in part via a transfer learning process, the transfer learning process comprises copying at least a portion of the transferred layer from another deep neural network.

20. The method of claim 13, where the camera is positioned to image a single current variable-appearance article at a time.

21. The system of claim 1, wherein the prepositional categorization of the predetermined relative location in relation to the conveyor is that the camera is above the conveyor.

22. The system of claim 1, wherein the prepositional categorization of the predetermined relative location in relation to the conveyor is that the camera is below the conveyor.

23. The system of claim 2, wherein the prepositional categorization of the predetermined relative location in relation to the article stream is that the camera is above the article stream.

24. The system of claim 2, wherein the prepositional categorization of the predetermined relative location in relation to the article stream is that the camera is below the article stream.

25. The method of claim 13, wherein the prepositional categorization of the predetermined relative location in reference to the article stream is that the camera is above the article stream.

26. The system of claim 13, wherein the prepositional categorization of the predetermined relative location in reference to the article stream is that the camera is below the article stream.

\* \* \* \* \*